Dec. 20, 1960  F. J. PETERSON  2,965,178
FUEL CONTROL MEANS FOR ROTARY WING AIRCRAFT
Filed Nov. 3, 1954   3 Sheets-Sheet 1

INVENTOR.
FREDERICK J. PETERSON
BY
Wilson, Redrow and Haines
ATTORNEYS.

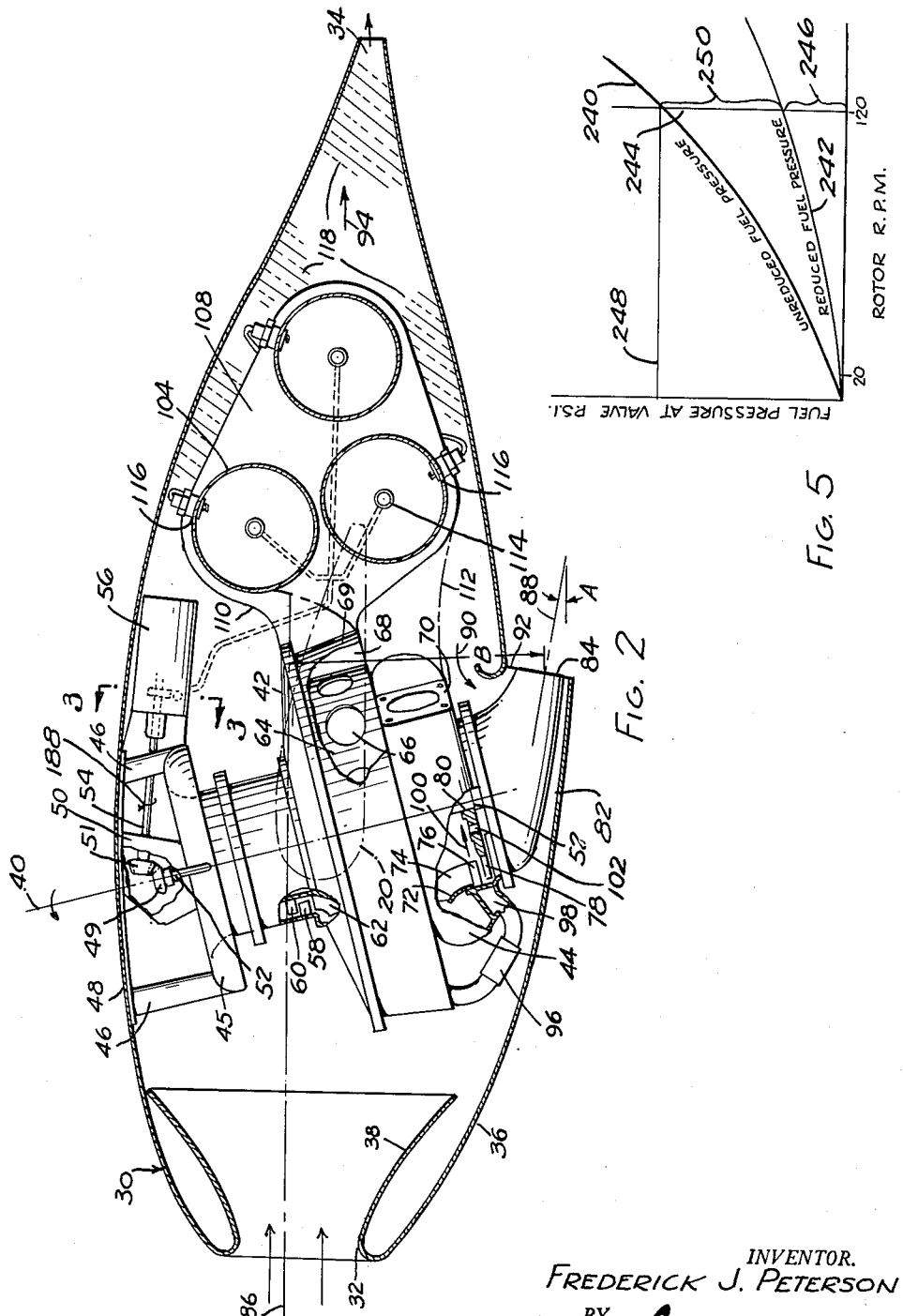

INVENTOR.
FREDERICK J. PETERSON

United States Patent Office 2,965,178
Patented Dec. 20, 1960

2,965,178
FUEL CONTROL MEANS FOR ROTARY WING AIRCRAFT

Frederick J. Peterson, Detroit, Mich., assignor to Studebaker-Packard Corporation, a corporation of Michigan Filed Nov. 3, 1954, Ser. No. 466,545

14 Claims. (Cl. 170—135.4)

The present application relates to fuel controls for fuel consuming engines, for instance, gas turbine engines. More specifically, it relates to a means for controlling fuel in a tip mounted engine for rotary wing aircraft.

The proportions and rotational speeds of the sustaining rotor for rotary wing aircraft such as helicopters are such that the centrifugal force on the rotor, particularly at the rotor periphery or wing tip becomes seriously large in modern day applications as illustrated by a not too unusual contemporary helicopter rotor design having a 42-foot effective radius or span to each wing and being rotated in service at 140 r.p.m. or more. The resulting peripheral speed in the rotor illustration just noted amounts to 620-feet per second or more. When bladed rotors of the character just noted carry their own tip mounted propelling devices which may be jet powered or propeller powered, or both, the propelling devices which in some instances involve gas turbine operation are usually fuel fed from a central source leading from adjacent the center of rotation of the rotor thence through radial liquid fuel passages extending span-wise of the individual sustaining blades or wings, and finally terminating in the instance of the gas turbine powered device in a set of combustion chamber spray nozzles.

Cumulative pressure build up on the liquid fuel contained in the radial fuel passages aforesaid occurs at the higher speeds of rotor rotation due to the tendency of the centrifugally slung fuel to pile up at the ends of the passages whereupon pressures may result which are many times in excess of the 500 p.s.i. pressure limitation on the operation of several commercially attractive fuel nozzles which inherently tend to lose their property of proper function when pressurized above approximately 500 p.s.i. From the standpoint of mathematical analysis, the existence of such pressures above the safe value for conventional nozzles is explained in helicopter rotor work simply by the fact that centrifugal forces increase as the square of the speed of rotation of the rotor and at higher speeds the resulting force in the liquid fuel soon reaches an excessive magnitude. The disadvantage of improperly functioning nozzles at the higher pressures which accompany higher rotor speeds are readily apparent.

It is an object of the present invention to overcome the noted disadvantages which can occur with tip mounted engine nozzles, by providing a reducing valve included at a point in a radially extending nozzle fitted fuel line so as to regulate the pressures at such point to desired values anterior to the nozzles.

Broadly, an object of the invention is to provide, in a tip mounted propelling device for the orbiting sustaining wing of a rotary wing aircraft, an exponentially tapered fuel pressure regulating valve for delivering fuel under regulated pressure to the propelling device and being sensitive to centrifugal forces effective on the orbiting propelling device in a manner to cause the pressure drop across the valve to increase in proportion to orbital speed of the device with the result that the ultimate reduced pressure at which the fuel is delivered only gradually increases if at all, as the orbital speed increases. Such result is considerably to be desired compared to an uninhibited unregulated situation under conditions of which the fuel is finally delivered under pressures increasing according to an exponential power of the speed as the speed increases.

Another object is to provide a fuel system which includes a regulating valve for a tip mounted propelling device for a rotary wing aircraft as defined in the preceding object, and wherein the valve is not only automatically controlled in accordance with rotor speed but wherein the propelling device includes a rotating power shaft and one or more limiting devices sensitive to different predetermined operating characteristics of the shaft for controlling the regulator valve in accordance with these characteristics. According to a feature of the invention, one such limiting device is a shaft speed sensitive device rotatable at speeds proportionate to the shaft speed of the propelling device and serving as a so-called limiting or topping governor. Another such limiting device contemplated is a shaft acceleration sensing device rotatable at speeds proportionate to shaft speeds of the propelling device and serving as a so-called accelerometer. The regulator valve acts the part of a common slave valve to the just noted topping governor and accelerometer valves, the former of which incorporates a master valve controlling element slidable radially in response to centrifugal force proportionate to power-shaft speed and the latter of which incorporates a master valve controlling element slidable at right angles to a radius and responsive to change of rate of acceleration proportionate to power-shaft acceleration.

Another object of the invention is the provision of a multiple functioning valve for use in fuel systems for engines and having a normal pressure regulating activity produced as a continuous function, coupled with the additional or dual function of serving as a limiting valve in accordance with the limiting operating characteristic of other directly connected or indirectly connected inertia masses associated therewith.

A further object of the invention is to provide, in a fuel control system for sustaining-wing tip engines, a plurality of master control valves arranged with a common slave valve connected thereto and hydraulically influenced by such master valves without the medium of special or conventional hydraulic fluids as such but rather by use solely of natural fuel pressures. According to one feature of the invention the slave valve is normally a back-pressure-regulated regulating valve but as an adjunct thereto incorporates two adjacent end portions of different diameters which when separately or together subjected to high fuel pressure due to the selective operation of either or both of the master valves as appropriate, cause the slave valve to cease its regulating function and uninhibitedly to move toward a fully closed fuel interrupting position.

A further object of the invention is the provision of a fuel system for a piece of orbiting and rotating propulsion machinery having a plurality of variously located fluid valves provided with receiving bores therefor, wherein one or more of the valves, particularly the valves whose distances from the center of orbit of the engine are constantly changed, are suspended in their bores by means of return springs constituted by open centered disks which prevent binding of the valves as they slide in their bores. In broader terms it is a feature of the invention to provide dished or Belleville type washers having open centers to receive portions of a movable valve so as to retain the axis of the same in a concentrically or radially unvarying position even though the valve retains freedom of movement in at lesat an axial direction and/or in a direction about its axis, Further features, objects and advantages will either be specifically pointed out or become apparent when for a better understanding of the invention reference is made to the following description taken in conjunction with the accompanying drawings in which:

Figure 2 is a longitudinal sectional view of the engine in side elevation taken along the section lines 2—2 of Figure 1;

Figure 5 is a graphical view illustrating a fuel pressure behavior pattern over a particular rotor speed range for the fuel system of the preceding figures.

Figure 1:
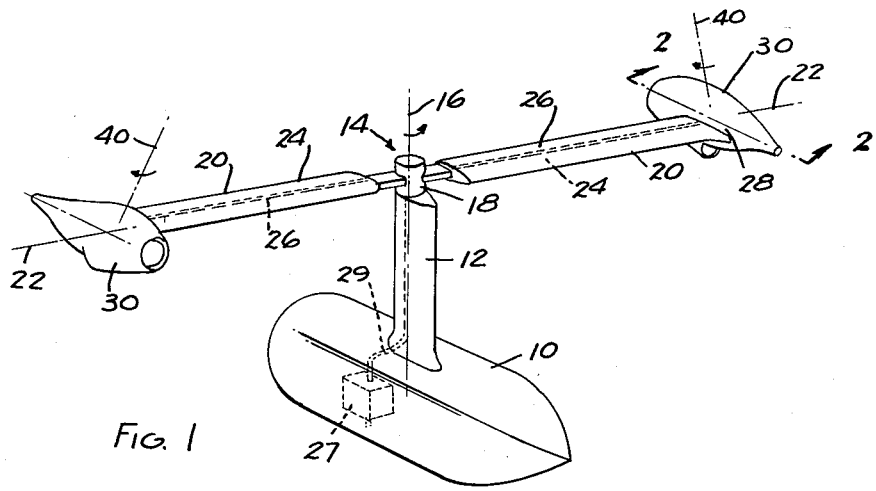
Figure 1 is a view of the present engine and fuel system therefor in the environment of a tip powered rotor type helicopter shown in perspective.

In the drawings, particularly Figures 1 and 2, a helicopter is shown illustrative of one type of sustaining rotor aircraft presently contemplated, the helicopter having a fuselage 10, an upwardly extending bearing containing mast 12, and a rotor assembly 14 having a central shaft set in the bearings contained in the mast 12 for rotation about a substantially vertical axis 16. The rotor assembly 14 has a central hub 18 to which a plurality of blades 20, two in number as shown, is attached at their inner ends to rotate as load sustaining members in a horizontal plane about the axis 16 as a center of orbit. The blades 20 are pivoted in customary fashion at their inner ends for slight oscillatory swinging movement and for independently adjustable angles of attack for selectively varying the degree of rotor lift. The hub 18 is arranged in known manner to assume various positions of nutation for purposes of guiding the helicopter. Each of the blades 20 possesses an airfoil cross section and along its center or spanwise axis indicated at 22 is provided with a plurality of control pipes and oil conduits such as at 24 and one or more fuel pipes or lines such as at 26. Such pipes, conduits and lines are supplied in a fashion, the details of which are omitted in the interests of brevity; suffice it to say that the fuel lines 26 are supplied with metered fuel by means of a pump supplied fuel metering device 27 located in the fuselage 10 and connected through a common vertical metered fuel line 29 to the radially extending fuel lines 26. Integrally secured to the tip of each blade 20 as by means of a faired section 28, a pod encased vertically shafted gas turbine jet engine 30 is provided. The hollow encasing pod or shell for the jet engine 30 is indicated at 36 and includes a pair of substantially longitudinally aligned air intake and vacuum breaking openings 32, 34 which, with respect to the orbital path of movement of the gas turbine 30 about the center 16 as an axis, are substantially axially aligned. The shell or pod 36 has a thin exterior skin of sheet metal which at the intake opening 32 defined thereby for intake or ram air is reversely bent on itself to define a smooth walled venturi portion 38. The vertically shafted gas turbine jet engine 30 is arranged such that the principal rotating components of machinery thereof rotate about the substantially vertical axis 40 and as viewed in Figure 1 particularly, this machinery preferably has a clockwise direction of rotation which is contra-directional with respect to the counter clockwise direction of rotation of the rotor and hub assembly 18 about the center axis 16. The choice of this contrarotational effect is for purposes of aiding the blade stability of the blades 20 in the regard of flapping (that is to say, oscillations in the instantaneous vertical plane of the blade axis 22) and in order to offset certain thrust couples inhering in the dynamics of operation of the helicopter.

In Figure 2, the principal pieces of rotating machinery in the engine 30 include a pair of vertically spaced apart compressor and gas turbine components 42, 44, respectively. The compressor component 42 receives ram air from the interior of the shell 36 through an upwardly open bell mouth 45 which is in continuous communication with the ram air opening 32 in the forward end of the sheet metal pod shell 36. A ring of four thin walled struts 46 spaced circumferentially at 90° from one another suspends the bell mouth 45 from the overhead or top side of the pod shell 36 through a suitable inside shell reinforcing plate 48 to which the struts are welded at their upper end. Secured at a point within the four struts 46 and held in the top of the pod shell by means of reinforcing plate 48, there is provided a bevel gear case 50 containing a pair of meshed bevel gears 49, 51 of which the gear 49 is directly connected to a main gas turbine power shaft 52 defining the noted vertical axis of rotation 40. The remaining gear 51 of the two bevel gears within the bevel gear case 50 is connected to an accessory shaft 54 with the result that the main shaft 52 and the accessory shaft 54 are thus interconnected through the bevel gears. A reduction ratio from the gear 49 to the gear 51 may be utilized for example in the order of a 1.2:1 gear reduction.

The accessory shaft 54 is substantially horizontally disposed and is connected to certain rotating mechanism in an accessory case 56 which includes a set of fuel regulating valves hereinafter described and also an oil circulating pump and a gas turbine starter, not shown. The stream of fresh air inducted through the shell inlet opening 32 and the bell mouth 45 is led into the compressor component 42 where it passes through one or more stages of stator vanes and diffuser vanes 58 and at least two stages of rotor vanes 60 and 62. The rotor vanes 60 in the compressor component 42 are of the axial flow type whereas the rotor vanes 62 in the compressor component 42 are of the centrifugal or radial flow type which cooperate to unusual advantage with the axial flow vanes 60. The radial flow vanes or blades 62 rotate within an annular inner housing 64 formed with a circumferential row of radially outwardly opening ports 66 communicating with a peripheral collecting chamber or compressed air ring 68 surrounded by a circumferential outer housing 69. The compressed air ring or collecting chamber 68 is arranged in conventional fashion for the tangential discharge of pressurized air therefrom.

The gas turbine component 44 has a peripheral scroll or motive fluid inlet ring which is supplied by means of a flanged tangential inlet 70. The motive fluid inlet ring in the turbine component 44 is of U shape in cross section having an internal disk 72 which cooperates with the inner periphery of the inlet ring to define an axial flow gas passage 74. One or more sets of stator and rotor blades 76, 78 are included in the turbine component and the latter blades 78 are secured to a turbine wheel splined at 80 to the main or power shaft 52 which is splined to and drives the compressor rotor vanes or blades 60, 62. The gas turbine component 44 has a tapering discharge exhaust collector 82 which terminates in a substantially wide rectangular opening 84 disposed in a plane substantially transverse to the longitudinal axis of the pod shell indicated at 86. The horizontal disposition shown for the axis 86 corresponds to the horizontal position of the tip and the faired section of the adjacent blade 20. Correspondingly, the angle of jet discharge through the opening 84 has an axis 88 which preferably forms an angle A with respect to the horizontal. Details of the angle of attack of the blade 20 and the allowable angles between the axis 40 and the vertical form no per se part of the present invention, being fully set forth in a copending application of Robert K. Grove, Serial No. 446,269 filed July 28, 1954, now Patent No. 2,843,210, and assigned to the assignee of the present application.

A portion of the ram air within the pod shell 36 is conducted as indicated by an arrow 90 through a gap 92 defined by means of a pod belly opening formed as a result of the downward offset of the discharge mouth of the exhaust collector 82 with respect to the pod belly opening and with respect to the underside of the after belly portion of the sheet metal pod shell 36. The resulting gap at 92 may be of the order of one or two inches for a normally sized helicopter and serves to break away the jet discharge at 84 from the under belly of the pod shell 36 in laminar flow along the axis 88.

Another portion of the ram air is led rearwardly in the direction of an arrow 94 and is discharged through the opening 34 at the rear of the sheet metal pod shell 36 so as to break up any vacuum or turbulence forming tendencies of the air stream flow externally of the pod shell 36.

A portion of the compressed air from the collector ring 68 is bled through a U-shaped conduit 96 into a fresh air collecting chamber 98 formed at one side of the motive fluid inlet chamber for the turbine component 44. The vanes 76 of the turbine stator are preferably hollow in the spanwise direction so as to receive the collected compressed air internally thereof from the chamber 98 and conduct such air radially inwardly in the direction of an arrow 100 so as to be led through an axial opening 102 in the wheel for the turbine rotor blades 78 from which the air is conducted into the exhaust collector casing 82. The main portion however, of compressed air is fed into a U-shaped conduit of composite structure of which the base of the U incorporates a set, preferably three in number, of tubular fuel burner elements or cans 104 disposed in side by side relationship. At its opposite ends, each of the burner elements 104 is securely mounted in a pair of spaced apart tube-header sheets, one of which is shown at 108. The leg portions of the U-shaped conduit are at different levels as seen at 110 and 112 respectively, and the outermost or upper leg portion 110 is tangentially connected to the compressed air collecting chamber 68 for the compressor component on the side of the latter away from the viewer viewing Figure 2. The lower leg portion 112 of the U is tangentially connected to the tangential inlet flange 70 on the side of the turbine component near the viewer viewing Figure 2. Compressed fresh air leaving the collecting ring 68 of the two stage air compressor component 42 is led through the outermost leg portion 110 of the U-shaped conduit and through the openings formed in the tube sheet 108 at the points at which the tubular burner elements 104 are received. Adjacent each just noted opening a fuel spray nozzle 114 is centrally located and at a nearby position in the side of each burner tube a spark igniter 116 is located. Fuel sprayed from the nozzles 114 and ignited by the spark igniters 116 burns in the compresser air atmosphere of the three burners 104 which are mechanically in parallel to one another for motive fluid flow and the resulting products of combustion are conducted from the ends of the burner tubes and the tube sheet in which they are anchored through the leg portion 112 of the U-shaped conduit and thereafter are fed tangentially into the inlet scroll of the gas turbine component 44. Inasmuch as the centrifugal forces effective on the gas turbine unit 30, as seen in the paper showing of Figure 2, are directed into the plane of the paper so to speak, the fuel particles from the spray nozzles 114 in order to move out of the plane of the paper must overcome the outward sling of the centrifugal forces involved and are thereby slowed down in their transit from each nozzle 114 to the opposite end of the tubular burner element 104. More complete combustion of the fuel accordingly tends to take place than in burners mounted otherwise and particularly so in the case of heavier and less well atomized fuel droplets or particles.

Much of the otherwise void space within the sheet metal shell pod 36 in its after portions may be filled with a body of fluid pervious sound deadening insulation material schematically appearing at 118. It will be noted from the paper showing of Figure 2 that the axis 88 of the center or core of discharge of the exhaust jet from the belly of the pod shell is offset by a distance B in vertical spacing below the central axis 86 of the pod shell 36. Such offset bears a direct relationship to the amount of inclination of the axis 40 with respect to the vertical and is more fully explained along with the reasons therefor in the noted co-pending Grove application, Serial No. 446,269.

Figure 3:
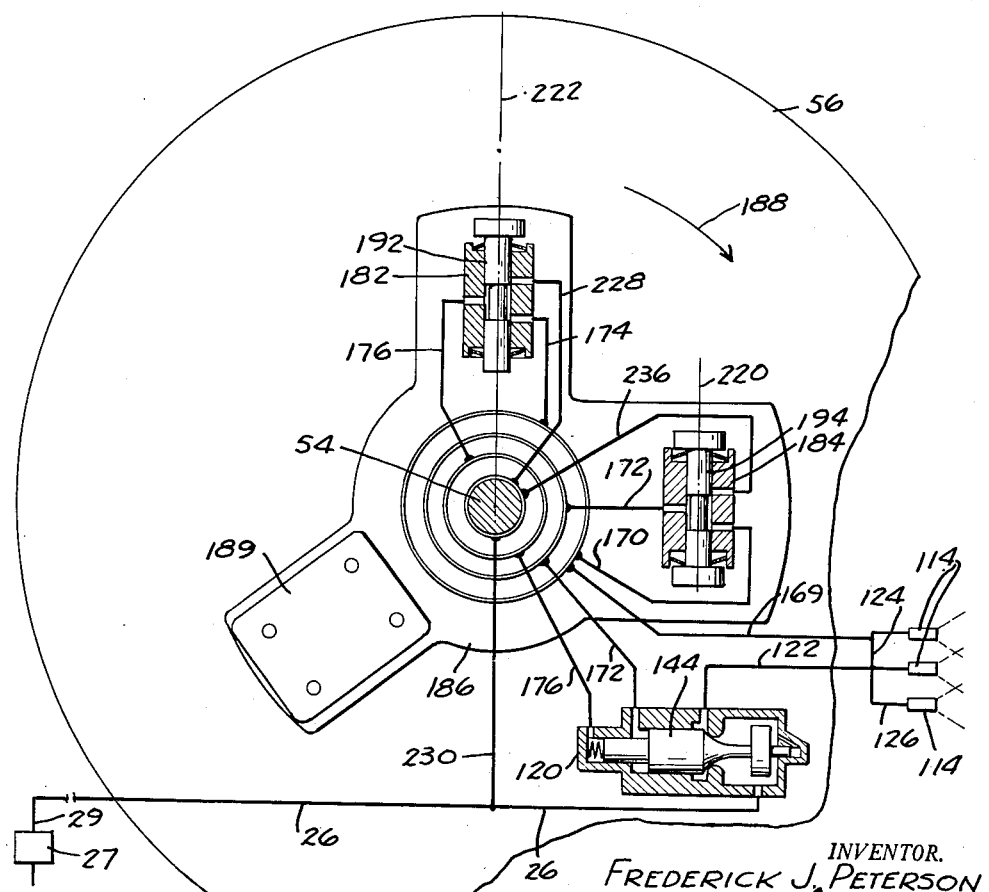
Figure 3 is a transverse sectional view of the fuel system, partially schematic, in side elevation taken along the section lines 3—3 of Figure 2.
Figure 4:
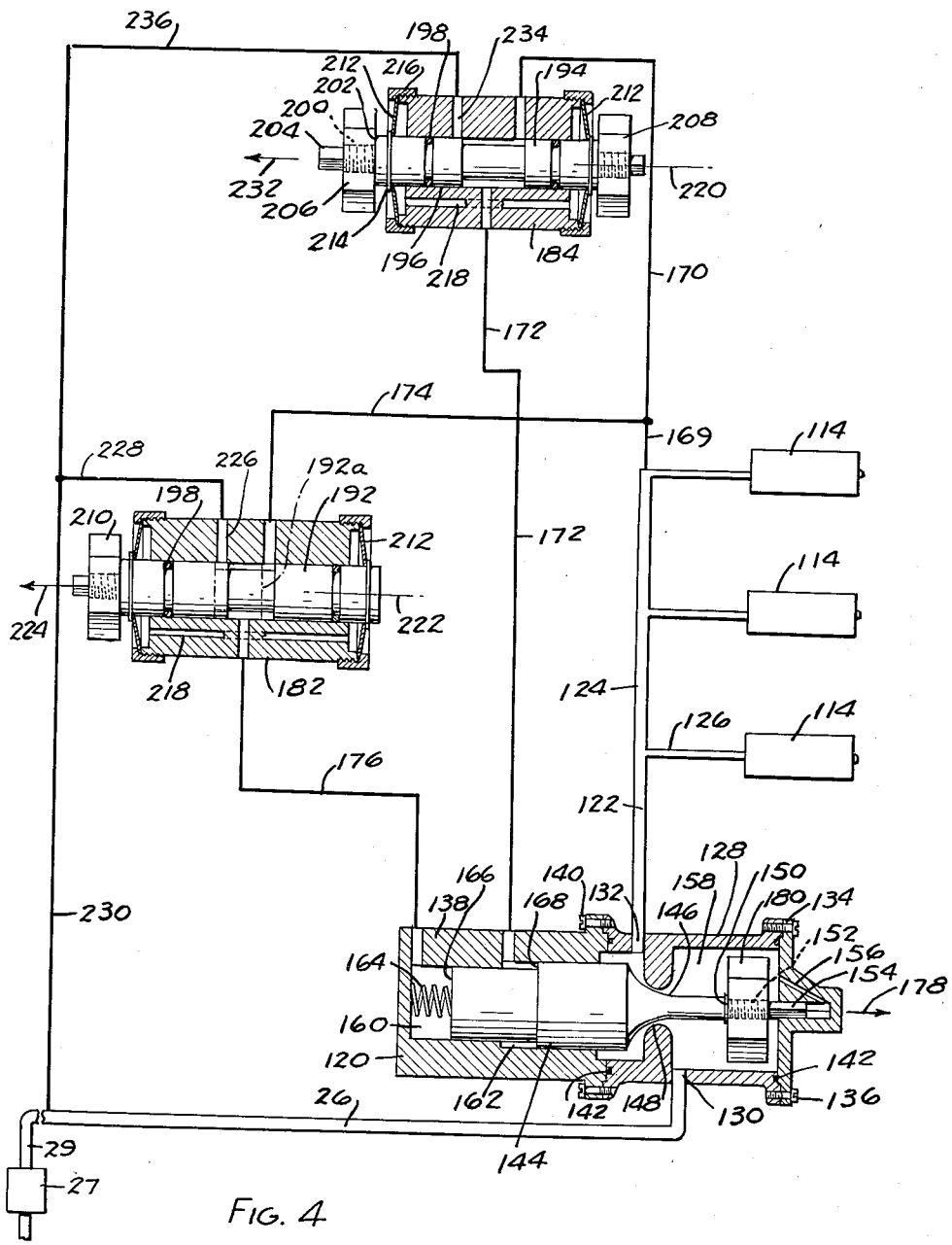
Figure 4 is a partially schematic view based on Figure 3 but drawn to enlarged scale.

In one or both of Figures 3 or 4, the pump supplied fuel metering device 27 can be seen to supply a typical one of the radially disposed fuel lines 26 mounted in the rotor wing by means of an interconnecting vertically disposed fuel line located in the mast 12 for the fuselage 10 for the helicopter. The metered fuel in the radial fuel line 26 travels the spanwise length of each of the wings 20, and in an unregulated state is transmitted to the three piece case or body of a regulating valve 120. The regulating valve 120 supplies fuel under regulated pressure through a pipe 122 leading to a fuel nozzle header 124 which through a series of individual supply lines 126 supplies the three nozzles 114 with metered regulated fuel. The three piece case of the regulating valve 120 is hollow and includes an intermediate piece 128 having a pair of opposite ports 130 and 132 connected to the lines 26 and 122 respectively, and also includes a cover piece 134 secured to the intermediate piece 128 as by means of a set of screws 136, and further includes a base piece 138 secured to the intermediate piece as by means of another set of screws 140. Appropriate O ring seals as at 142 may be provided between the three valve case pieces 128, 134, 138 to insure fluid tight integrity to the case of the valve.

Slidably mounted in the hollow cased valve 120, a shiftable valve element 144 is provided having a tapering regulating portion 146 of complex curvature which may be laid out and generated according to an exponentially varying mathematical function for cooperation with a companion valve regulating opening 148 defined in the open center of an inwardly projecting radial flange or wall integrally formed inside the intermediate valve body piece 128. One end portion of the valve element 144 is of reduced cross section so as to define a shoulder 150 and is externally threaded thereadjacent at 152. The end portion toward its extremity is further reduced at 154 adjacent the threads 152 so as to provide a tool receiving non-circular cross section preferably of square shape. The square section portion 154 is slidably received in a companion square bore formed in the cover piece 134 which at its outer end communicates through a diagonal passage 156 with the interior of the intermediate piece 128 as indicated at 158. The passage 156 forms a continually open bleed which prevents a hydraulic block from occurring at the end of the square portion 154 of the slidable valve element 144. The opposite end of the slidable valve element 144 is received in a pair of concentric stepped cavities of differing diameters formed in the base portion 138 of the case, the smaller one of which is indicated at 160 and the larger one of which is indicated at 162. A valve return spring 164 is located in the smaller cavity 160 and seats at one end against the closed end wall of the base piece 138 and thrusts at the opposite end against the bottom of the valve 144 so as to shift the valve and move the curved regulating portion 146 thereof toward closed position for closing the opening 148. The valve element 144 has a companion pair of stepped-diameter portions 166, 168 which are received in the cavities 160 and 162 for slidable movement.

Normally the surface end areas exposed by the portions 166 and 168 are subjected to the regulated metered fuel pressure existing in the header 124 by means of the interconnection formed of a pair of hydraulically parallel paths defined by a system of pipes 169, 170, 172 and 169, 174, 176 connected in that order respectively. It is readily apparent that the unregulated metered fuel pressure existing at the port 130 in the intermediate valve case piece 128 is exerted against the valve 144 in a manner to tend to unseat the same and increase the path of clearance in the regulating opening 148. An opposing valve closing motion results due to the regulating metered fuel pressure at 132 which when proportionately communicated to the valve end areas 166 and 168 tends to shift the valve element 144 and close the valve regulating opening 148. It follows therefore that the magnitude of the pressure drop across the opening 148 and the magnitude of the valve closing forces at 166 and 168 vary inversely with respect to one another such that the valve closing force weakens when the pressure drop becomes excessive, because when the back pressure is greatly reduced, the valve closing force reduces and the valve regulating portion 146 shifts to increase the clearance of the opening 148.

The regulating valve body 120 is stationarily held in the accessory case 56, Figs. 2 and 3, and the shiftable valve element 144 therein is so mounted as to be affected by the centrifugal force effective on the orbiting engine 30 which thus tends to sling the valve 144 in a radially outwardly valve closing direction as indicated by an arrow 178 in Fig. 4. To augment the influence of the centrifugal valve closing force, a hexagonally shaped internally threaded nut 180 having a finite inertia mass or weight may be provided which is threaded on to the threaded portion 152 of the shiftable valve element 144 and retained thereon as by means of a lock washer clamped thereby against the abutting shoulder 150. The tool receiving square portion 154 assists in holding the valve element 144 stationary while the nut 180 is run down on the threads 152 toward the shoulder 150 to collapse the lock washer retainer.

A set of control valves which are hydraulically connected in the fuel system with the stationary regulating valve 120 and are consolidated in the common accessory case 56 therewith includes a centrifugally actuated topping governor valve 182 and an acceleration sensitive accelerometer valve 184. The just noted valves 182 and 184 perform a master valve function to the common slave or regulating valve 120 controlled thereby and are mounted along two arms of a three armed spider 186 which is splined fast to the accessory shaft 54 for rotation therewith in a clock-wise direction indicated by an arrow 188, Figure 3. The third arm of the three-armed spider 186 has a rectangular lead counterweight 189 doweled and pinned thereto for purposes of statically and dynamically balancing the two arms of the spider to which the valves are mounted.

At the hub of the spider 186 there is a series of four concentric rotary liquid seals provided outside of the accessory shaft 54, of which the fourth outermost seal outside of the shaft 54 provides a rotary sliding seal establishing constant communication between the line 169 from the nozzle header 124 and the lines 170 and 174 respectively which lead to the corresponding topping governor 182 and to the accelerometer valve 184. Each of the valves 182 and 184 incorporates a spool valve element 192 and 194 respectively which spools define an included annular land of reduced cross section and which in its normal unactuated position interconnects the path for regulated pressure fuel in the pipes 174 and 170 respectively and the path for fuel in the respective pipes 176 and 172 leading to the slave control chambers 162 and 160 in the regulating valve 120. Accordingly, the regulating valve 120 assumes a hydraulically balanced fuel regulating function wherein the fuel back pressure existing in the port 132 therein varies inversely with the pressure drop across the regulating valve opening 148 as previously described. The valves 182 and 184 are very similar in construction to one another except for minor differences hereinafter noted. In the interests of brevity, only the accelerometer valve 184 is now described in detail. The slidable spool valve element 194 therein is received in a straight through uniform bore 196 formed in the body of the valve 184 and is sealed thereto along sliding portions of the two spools actually shown as by means of appropriate O-ring seals at 198. At one end the slidable spool valve element 194 has a threaded portion 200 of reduced diameter which at one end forms a shoulder 202 and which at its opposite or outer end has a further reduced portion 204 of non-circular cross section preferably square. A hexagonal nut 206 is threadably received on the threads 200 at a time when the spool valve element 194 is held stationary as by means of an appropriate complementary non-circular tool or wrench receiving the square portion 204 and the nut 206 is brought up tight in adjacency to the shoulder 202 so as to clamp a retaining lock washer thereagainst. The opposite end of the spool valve element 194 is similarly provided with a hexagonal nut 208, the nuts 206, 208 both having an inertia mass or weight suitable for sensing acceleration. By way of distinction, the centrifugal governor valve 182 has only one hexagonal nut 210 providing an inertia mass or weight therefor. Between each of the nuts or masses as for instance the nut 206 and the adjacent valve seal 198, an open centered dished Belleville spring washer 212 is provided and arranged with the open center thereof surrounding the spool portion at the end of the valve and being held axially fast thereto as by means of one or more snap rings 214. The outer periphery of each Belleville washer is clamped between an end of the case of the valve 184 and a radially inturned flange formed on a hexagonal threaded nut 216 received in external threads on the end of the valve body 184. The Belleville springs 212 on each of the valve elements 182, 184 serve to bias the valves toward their normal or unactuated position whereby regulated fuel pressure in the pipe 169 is communicated directly to the end portions of the valve 120 located in the slave chambers 160, 162.

As best seen in Figure 3, the pipe 172 between the valves 184 and 120 includes the third outermost rotary liquid seal at the hub of the spider 186. The pipe 176 between the valves 182 and 120 includes the second outermost rotary liquid seal outside of the accessory shaft 54. An equalizing passage is provided at 218 in the topping governor and accelerometer valves 182, 184 so as to equalize the pressures of any liquid or air trapped in the chambers beneath the Belleville washers 212 at the ends of the valve body so as to prevent any hydraulic blocks or interference with the operation of the deflectable Belleville washers. Both in its normal and its deflected or disturbed positions, the Belleville washers 212 tend to center the valve elements 194 and 192 in their respective bores so as to prevent binding from the transverse forces exerted thereon due to the centrifugal forces of rotation of the accessory shaft 54 or the centrifugal force of orbit of the engines 30 about the vertical axis 16. The axis along which the valve element 194 is slidable and with respect to which the Belleville springs retain the element centered is shown at 220 and will be noted to be perpendicular to a radius, not shown, leading thereto from the center of rotation of the accessory shaft 54. The axis along which the governor valve element 192 reciprocates and with respect to which the Belleville springs 212 hold the valve concentric is indicated at 222 and will be noted to extend radially from the center of rotation of the accessory shaft 54 about which the valves 182 and 184 rotate. Under the influences of centrifugal force in a direction indicated by an arrow 224, Figure 4, the governor valve element 192 when rotating at the higher speeds with the spider 186 on the shaft 54 tends to be shifted along the radial axis 222 to a dotted line position shown by the dotted lines 192a, Fig. 4, whereby the regulated fuel pressure passage 174 is blocked off and an opening or port 226 formed in the case of the valve 182 is brought into communication with the slave chamber passage 176 through the open path about the central annular reduced portion between the spools of the now shifted spool valve element 192. The port 226 in the valve case is connected through a pipe 228 to the first or innermost shaft rotary seal outside of the shaft 54 which in turn is connected through a pipe 230 to the unregulated radial metered fuel passage 26 in a rotor blade 20. Thus when the mass of the governor nut 210 due to centrifugal force overcomes the resistance of the Belleville return springs 212 so as to shift the governor valve element 192 to an outward displaced position 192a, unregulated metered fuel pressure is introduced by the valve 182 from the pipes 26, 230 and 228 into the pipe 176 and the slave chamber 160 so as to pressurize and force the regulating valve element 144 toward a closed position as a result of the application of such unregulated fuel pressure against the valve end area 166. By proper selection of the spring rate of the Belleville return springs 212 and the mass of the governor weight 210 and governor valve element 192, the topping governor 182 may be made to operate at a predetermined speed of shaft rotation proportionate to the speed of the engine 30 to reduce or interrupt the flow of fuel to the nozzles 114 at exactly the desired limiting speed of rotation of the engine power shaft 52, for instance, 4500 r.p.m.

The accelerometer valve 184 has a center line lying upon an axis 220 perpendicular to a radius, not shown, from the shaft 54 and due to the clockwise direction of rotation for the spider 186 indicated in the direction of the arrow 188 tends to be displaced in the retractive direction of the arrow 232, Fig. 4, at all times at which the accessory shaft 54 is accelerating in speed. Determined by the spring rate of the Belleville return springs 212 in their relation to the masses of the nuts 206, 208 and the spool valve element 194, the accelerometer function of the valve 184 may be made to occur at any desired limiting rate of acceleration thought to have a tendency to cause damage to the rotating parts of the engine 30 or to the associated wing and shell structure. When the spool valve element 194 is displaced due to the reaching of a predetermined limiting rate of acceleration by the rotating accessory shaft 54, such rate being a direct proportional measure of the acceleration of the power shaft 52, the regulated metered fuel pipe 170 is closed by the spool valve element 194 in its retracted position, not shown, and a port 234 in the case of the valve 184 is brought into communication with the pipe 172 leading to the slave chamber 162 in the regulating valve 120. The noted port 234 is additionally connected through a pipe 236 to the first outermost rotary seal about the accessory shaft 54, Figure 3, which is supplied with unregulated metered fuel pressure from the pipe 230. Accordingly when the acceleration responsive valve element 194 is retractively displaced so as to close off the regulated fuel pipe 170 and establish the communication of unregulated metered fuel pressure from the port 234 to the slave pipe 172, the slave chamber 162 in the valve 120 becomes pressurized to exert a pressure on the end area 168 of the valve element 144 and move the latter toward a closed position for reducing or shutting of the supply of fuel going to the burner nozzles 114.

Thus when either one or both of the two master valves 182, 184 reach a limiting condition due to excessive speed or acceleration of the shaft 54, the result is that the common slave valve 120 thereto tends to close and interrupt the supply of fuel to the engine 30 and prevent any damage due to over-speed or over-acceleration or both. Below these limiting conditions, however, the valve 120 performs undisturbed in its primary function of regulating the fuel pressure of the metered fuel to values within which the nozzles 114 will properly function.

In Figure 5, the operation of the regulating valve 120 in its primary function just referred to is illustrated in graphical form. The unregulated or unreduced metered fuel pressure in the valve anterior port 130 is represented by a curve 240 plotted against speed of the rotor 18 in r.p.m. The posterior regulated or reduced metered fuel pressure under the same conditions is shown by means of a curve 242 from which it will become apparent, for instance, at the rotor speed of 120 r.p.m. as indicated by an ordinate representing line 244, that the resulting reduced pressure assumes a relatively small value as at 246 in comparison to the potential value indicated by the level of an abscissa representing line 248 to which the nozzles would otherwise be subjected. The increment of difference between the values just noted as seen at 250 and in terms of the 120 r.p.m. ordinate line thereof represents the pressure drop effective across the regulating valve 120 in its normal operation at the specified r.p.m.

As herein disclosed, the engine accessory shaft shown is driven through reduction bevel gearing from a power shaft and in turn drives the topping governor and accelerometer valves about its own axis which is in a vertical plane transverse to the spanwise axis of the sustaining wing 20 for the helicopter rotor 18. It is evident that the topping governor and the accelerometer can be readily arranged to be driven with their axes of rotation approximately in the vertical plane of the wing 20 or that the topping governor and the accelerometer can be synchronously driven directly from and concentrically to the power shaft or at a different ratio from the actual speed of both the accessory shaft and the power shaft. So also the hydraulic interconnection shown between each of the accelerometer and the topping governor and the common slave valve 120 is described as being filled with pressurized fuel which is naturally readily available from the fuel system but self-evidently a separate hydraulic circuit charged with commercial hydraulic fluid may be employed to produce the hydraulic interconnection just referred to. The centrifugally actuated mass 180 is shown to be mechanically connected to the valve 144 by means of threads and a lock washer but indeed it is not essential that a mechanical connection be employed and a hydraulic interconnection may be substituted therefor after the above described manner of the topping governor valve 182 and the accelerometer valve 184. In any case the regulating valve element 144 will be subjected directly only to a force exerted in proportion to the centrifugal forces of orbital movement effective of the wing 20 about the axis 16 whereas the topping governor valve element 192 is subjected to a force exerted in proportion to the centrifugal forces effective on the rotating shafts 54 and 52 and in addition is subjected to the dynamic forces of being orbited about the axis 16 in a manner so as to be constantly changing its distance with respect to the axis 16 while orbiting thereabout. The accelerometer valve element 194 is subjected to the binding action of a force exerted in proportion to the centrifugal forces effective upon the rotating accessory shaft 54 and the power shaft 52, and in addition is constantly changing its distance with respect to the vertical axis 16 about which it orbits. Their concentricity and freedom from binding is insured however by the disk type return springs 212.

Variations within the spirit and scope of the invention described are equally comprehended by the foregoing description.

What is claimed is:

1. In a tip mounted engine arrangement for the sustaining rotor of a helicopter, an engine-feeding, metered fuel line between the center of rotation of the rotor and the engine, a regulating valve interposed in the metered fuel line, and a plurality of inertia masses having individual means operatively connecting the same selectively to the valve for exerting separate valve closing forces on the regulating valve as a varying function of specified rotational characteristics of the engine arrangement.

2. In a rotary wing aircraft having a controlled fuel engine mounted to an orbiting wing thereof at a location substantially upon the spanwise axis of the wing but spaced apart from the center of rotation thereof, said engine having a main shaft defining an axis of rotation disposed transversely to the spanwise wing axis, fuel control means for the engine including a shiftable fuel regulating valve, means for exerting a first force on the regulating valve proportionate to the orbital speed of movement of the engine and the wing about said first named center of rotation, means for exerting a second force on the regulating valve incident to the attainment of a predetermined engine shaft speed of rotation, and means for exerting a third force on the regulating valve incident to the attainment of a predetermined engine shaft acceleration.

3. In a rotary wing aircraft having a controlled fuel engine mounted to an orbiting wing thereof at a location substantially upon the spanwise axis of the wing spaced apart from the center of rotation thereof, said engine having a main shaft defining an axis of rotation disposed transversely to the spanwise wing axis, fuel control means for the engine including a shiftable fuel regulating valve, a mass for controlling the application of a first force on the regulating valve proportionate to the orbital speed of movement of the engine and the wing about said first named center of rotation, a second mass for controlling the application of a second force on the regulating valve incident to the attainment of a predetermined engine shaft speed of rotation, and a third mass for controlling the application of a third force on the regulating valve incident to the attainment of a predetermined engine shaft acceleration.

4. In a tip mounted jet engine arrangement for the sustaining rotor of a rotary wing aircraft whereof the engine has a power shaft defining an axis of rotation which is disposed transversely to a spanwise wing axis of the rotor, fuel control means for the engine including a shiftable fuel controlling valve, a centrifugally actuated mass carried by the shiftable valve and effective to cause a first valve closing force to be exerted on the shiftable fuel controlling valve in proportion to centrifugal force due to the speed of rotation of the rotor, centrifugally actuated fluid directing means mounted radially of the engine power shaft for proportionate rotation to and orbiting with the engine power shaft effective to cause a second valve closing force to be exerted on the fuel controlling valve incident to the attainment of a predetermined engine shaft speed of rotation, and second fluid directing means mounted for rotation with its axis perpendicular to a radius and rotatable proportionately with the power shaft effective to create a third valve closing force incident to attainment of a predetermined engine shaft rate of acceleration.

5. For use with a tip mounted engine for the rotary wing of an aircraft wherein the engine has a power shaft arranged substantially normal to and orbiting in the plane of rotation of the wing, a fuel system for the engine incorporating a fuel regulating valve orbiting with the engine and including a valve element radially shiftable in the plane of rotation of the wing, said valve having a body provided with adjacent stepped cavities receiving portions of different diameters formed on the valve element and cooperating therewith to define individual valve controlling chambers, first means for selectively moving to direct pressure creating fluid against the valve element portion in one valve controlling chamber to urge the valve element toward a closed position incident to attainment of a predetermined speed of power shaft rotation, said first selectively moving means having a radialwise axis of movement and being rotatable about the center of the radius in correspondence with the speed of the rotating power shaft, second means for selectively moving to direct pressure creating fluid against the valve element portion in another valve controlling chamber to urge the valve element toward a closed position incident to attainment of a predetermined rate of acceleration of the power shaft, said second selectively moving means having an axis of movement perpendicular to a radius and being rotatable about the center of the radius in correspondence with the speed of the rotatable power shaft, and third means for selectively moving to apply a varying force to a portion of the valve element to urge the same toward a closed position, the just named closing force varying in proportion to the centrifugal orbital force on the engine and being directed radially in the plane of rotation of the wing.

6. For use with a tip mounted engine for the rotary wing of an aircraft wherein the engine has a power shaft arranged substantially normal to and orbiting in the plane of rotation of the wing, a fuel system for the engine including a fuel regulating valve orbiting with the engine and having a valve element radially shiftable therewithin in the plane of rotation of the wing, said valve element having pressure movable portions of different diameters formed thereon, first means for selectively moving to direct pressure creating fluid against one valve element portion aforesaid to urge the valve element toward a closed position incident to attainment of a predetermined speed of power shaft rotation, said first selective means having radially disposed axis of movement and being rotatable about the center of the radius in correspondence with the speed of the rotating power shaft, second means for selectively moving to direct pressure creating fluid against another valve element portion aforesaid to urge the valve element toward a closed position incident to attainment of a predetermined rate of acceleration of the power shaft, said second selective means having an axis of movement perpendicular to a radius and being rotatable about the center of the radius in correspondence with the speed of the rotatable power shaft, and third means for selectively moving to apply a varying force to a portion of the valve element to urge the same toward a closed position, the just named closing force varying in proportion to the centrifugal orbital force on the engine and being directed radially in the plane of rotation of the wing.

7. For use with a tip mounted engine for the rotary wing of an aircraft wherein the engine has a power shaft, a fuel system for the engine including a fuel regulating valve orbiting with the engine and having a valve element radially shiftable in the plane of rotation of the wing, said valve having a hollow body operatively receiving portions of different diameters formed on the valve element and cooperating therewith to define valve controlling chambers, first rotating means having selective limited movement to cause a pressure creating fluid to be directed against the valve element portion in one valve controlling chamber to urge the valve element toward a closed position incident to attainment of a predetermined speed of power shaft rotation, said first selective means having its axis of limited movement disposed radially in its plane of rotation and being rotatable in such plane in correspondence with the speed of the rotating power shaft, second rotating means having selective limited movement to cause a pressure creating fluid to be directed against the valve element portion in another valve controlling chamber to urge the valve element toward a closed position incident to attainment of a predetermined rate of acceleration of the power shaft, said second selective means having its axis of limited movement disposed perpendicularly to a radius in its plane of rotation and being rotatable in such plane in correspondence with the speed of the rotatable power shaft, and third means for selectively moving to apply a varying force to a portion of the valve element to urge the same toward a closed position, the just named closing force varying in proportion to the centrifugal orbital force on the engine and being directed radially in the plane of rotation of the wing.

8. In a rotary wing aircraft provided with a tip mounted jet engine having a rotating power shaft which in turn orbits about the center of rotation of the rotary wing, a fuel system comprising a fuel line leading to the tip mounted engine and including an interposed pressure reducing device having a shiftable valve member, said valve member being unseated by the application of the force of the higher upstream fuel pressure to a small area thereof which will create a pressure drop thereacross to yield a lower downstream fuel pressure, and first and second control valves in the system each including a valve element normally positioned to apply the lower pressure to one portion of a large area on the shiftable valve member so as to partially balance the force of the higher upstream pressure, and being shiftable to another position to apply the higher pressure to said portion of the shiftable valve member so as to overcome the force of the higher pressure on said small valve area, one of said control valve elements being shiftable to said other position under centrifugal force at a speed corresponding to power shaft speed, and the other control valve element being shiftable to said other position under rotative accelerative force at a rate of acceleration corresponding to power shaft acceleration.

9. In a rotary wing aircraft provided with a tip mounted jet engine having a rotating power shaft which in turn orbits about the center of rotation of the rotary wing, a fuel system comprising a fuel line leading to the tip mounted engine and including an interposed pressure reducing device having a shiftable valve member, said valve member being unseated by the force of the higher upstream fuel pressure over a small area thereof which will create a pressure drop thereacross to yield a lower downstream fuel pressure, and control valve means including at least one valve element normally positioned to apply the lower pressure to one portion of large area on the shiftable valve member so as to partially balance the force of the higher upstream pressure, and being shiftable to another position to apply the higher pressure to said portion of the shiftable valve member so as to overcome the force of the higher pressure on said small valve area, said control valve element being shiftable to said other position under forces created according to rotational shaft characteristics corresponding to a preselected limiting value of power shaft rotation.

10. In combination with an engine and power shaft arrangement mounted at the tip of a rotary aircraft wing and providing rotary power about its own axis and bodily orbiting about the center of rotation of of the wing, a fuel system for the engine including a fuel line leading from the wing to the engine, means for exerting a first-applied centrifugal force proportionate to the orbital speed of the engine, means for exerting a second-applied force incident to the attainment of a predetermined speed of rotation of said power shaft, means for exerting a third-applied force incident to the attainment of a predetermined rate of rotative acceleration of said power shaft, and a reducing valve common to all said means which is included in said fuel line adjacent the engine and to which the first, second and third exerted forces are applied in a direction to tend to close the valve, said reducing valve having at least one area thereof exposed to the reduced pressure from the reducing valve to bias the reducing valve in a closing direction with a force inverse to the magnitude of the effective pressure reduction thereacross prior to said second and third forces being applied to the reducing valve.

11. In combination with a rotary power engine and shaft arrangement mounted at the tip of an aircraft sustaining wing and generating rotary power about its own axis and orbiting bodily with and about the center of rotation of the wing, a fuel system for the engine including a fuel line leading from the wing to the engine, rotating weight means mounted for rotation with the shaft for exerting a first-applied centrifugal force proportionate to the orbital speed of the engine, a second rotating weight means mounted for rotation with the shaft for exerting a second-applied force incident to the attainment of a predetermined speed of rotation of said power shaft, a third rotating weight means mounted for rotation with the shaft for exerting a third-applied force incident to the attainment of a predetermined rate of rotative acceleration of said power shaft, and a reducing valve common to the weight means aforesaid which is mounted in said fuel line adjacent the engine and to which the first, second, and third exerted forces are applied in the same direction to tend to close the valve, said reducing valve being so included in said line as to have at least one area thereof exposed to the reduced pressure created by the valve to bias the valve in a closing direction with a force varying inversely to the magnitude of the effective pressure reduction thereacross prior to said second and third forces being applied to the valve.

12. In a fuel system for a rotary wing aircraft having a tip mounted fuel powered engine provided with a main shaft disposed transversely to the spanwise axis of the rotating wing, a fuel line mounted to the rotating wing and leading to the tip mounted engine, a reducing valve included in the fuel line to reduce the high pressure on the centrifugally slung fuel therein prior to the consumption thereof in the engine and having a small area exposed to and tending to be unseated by the said high pressure, and safety control valve means connected to the fuel system including separate shiftable valve elements normally positioned to apply the reduced pressure of the fuel to be consumed to large portions of the reducing valve to balance the described unseating force thereon of the high pressure, and being shiftable to other positions to apply the high pressure to the same large portions of the reducing valve so as to prevail over the unseating force to seat the reducing valve and close the fuel line, said shiftable valve elements being rotated at a speed corresponding to the speed of the main shaft and being shifted to said other positions as determined according to a limiting operating characteristic of shaft rotation.

13. In a fuel system for a rotary wing aircraft having a tip mounted fuel powered engine provided with a main shaft disposed transversely to the spanwise axis of the rotating wing, a fuel line mounted to the rotating wing and leading to the tip mounted engine, a reducing valve included in the fuel line to reduce the high pressure on the centrifugally slung fuel therein prior to the consumption thereof in the engine and having a small area exposed to and tending to be unseated by the said high pressure, and safety control valve means connected to the fuel system and including at least one shiftable valve element normally positioned to apply the reduced pressure of the fuel to be consumed to a large portion of the reducing valve to partially balance the unseating force thereon from high pressure, and being shiftable to another position to apply the high pressure to a large portion of the reducing valve so as to prevail over the unseating force to seat the reducing valve and close the fuel line, said shiftable valve element being rotated at a speed corresponding to the speed of the main shaft and being shifted to said other position as determined according to a limiting operating characteristic of shaft rotation.

14. In a fuel system for a rotary wing aircraft having a main power shaft incorporated in a tip mounted propulsion engine, the power shaft axis being disposed in a first plane transverse with respect to the plane of rotation of the rotating wing, a fuel line mounted to the rotating wing and leading to the tip mounted engine, a reducing valve included in the fuel line to reduce the high pressure on the centrifugally slung fuel therein prior to its consumption in the engine and having a small area exposed to and tending to be unseated by the high pressure aforesaid, and safety control valve means interposed in the fuel system and connected to rotate in said first transverse plane at a speed corresponding to power shaft speed, said safety control valve means having a bore slidably receiving a valve element having one position to apply the reduced pressure of the fuel to be consumed to a large portion of the reducing valve to partially balance the unseating force thereon from the high pressure, and being slidable to another position to apply the high pressure to a large portion of the reducing valve so as to prevail over the unseating force and seat the fuel valve to close the fuel line, said control valve element having disk-like return springs surrounding the opposite ends thereof for suspending the same so as to float concentrically within the valve bore without binding from transverse centrifugally exerted forces.

References Cited in the file of this patent

UNITED STATES PATENTS

| | | |
|---|---|---|
| 2,474,359 | Isacco | June 28, 1949 |
| 2,516,489 | Stalker | July 25, 1950 |
| 2,594,788 | Morain | Apr. 21, 1952 |
| 2,596,161 | Murdock et al. | May 13, 1952 |
| 2,597,582 | Gruss | May 20, 1952 |
| 2,633,830 | McCourty et al. | Apr. 7, 1953 |
| 2,702,560 | Bobier | Feb. 22, 1955 |